June 6, 1961 — C. L. MORSE — 2,987,363
COOKING OVEN
Filed Dec. 13, 1957 — 5 Sheets-Sheet 1

INVENTOR.
Charles L. Morse
BY
Barlow & Barlow
ATTORNEYS.

June 6, 1961 C. L. MORSE 2,987,363
COOKING OVEN
Filed Dec. 13, 1957 5 Sheets-Sheet 2

INVENTOR.
Charles L. Morse
BY
Barlow & Barlow
ATTORNEYS.

June 6, 1961  C. L. MORSE  2,987,363
COOKING OVEN
Filed Dec. 13, 1957  5 Sheets-Sheet 3

INVENTOR.
Charles L. Morse
BY
Barlow & Barlow
ATTORNEYS.

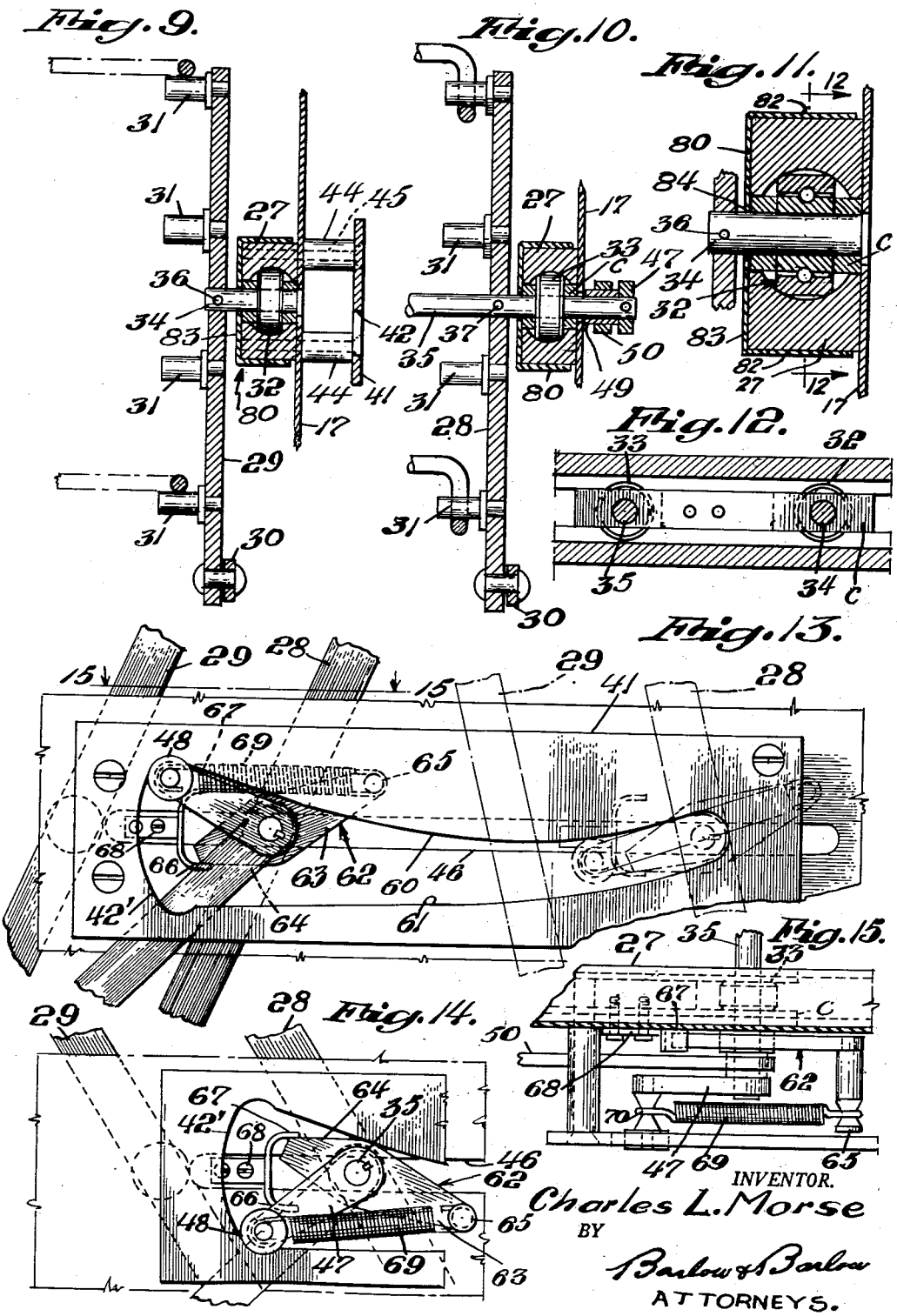

June 6, 1961 C. L. MORSE 2,987,363
COOKING OVEN
Filed Dec. 13, 1957 5 Sheets-Sheet 5
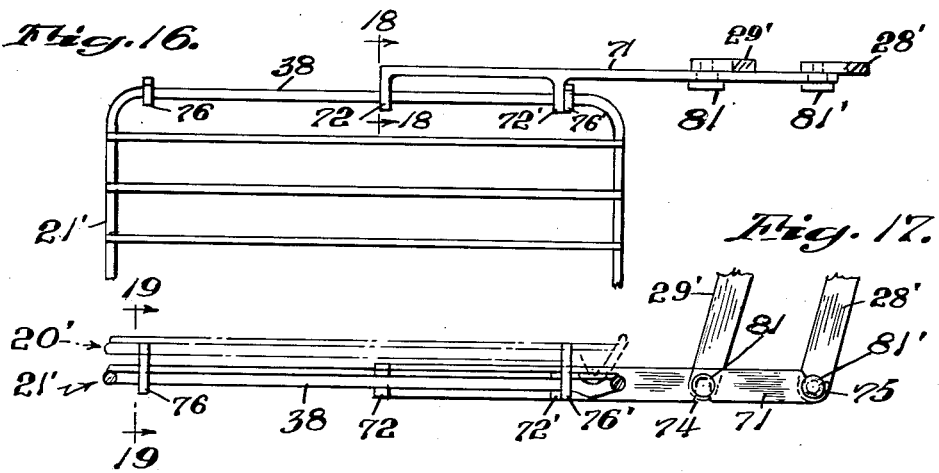
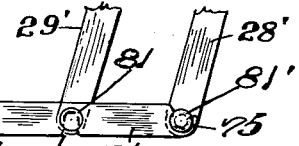
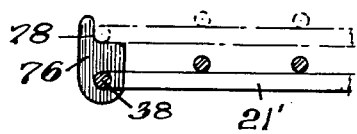
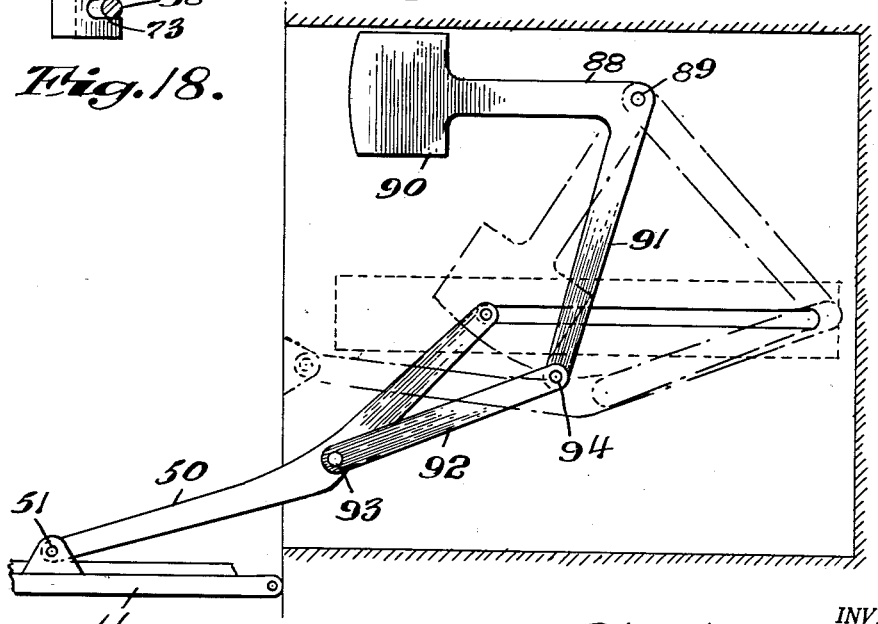
INVENTOR.
Charles L. Morse
BY
Barlow & Barlow
ATTORNEYS.

United States Patent Office 2,987,363
Patented June 6, 1961

2,987,363
COOKING OVEN
Charles L. Morse, Box 156, South Dartmouth, Mass.
Filed Dec. 13, 1957, Ser. No. 702,686
7 Claims. (Cl. 312—274)

This invention relates to improvements in mechanism for automatically extending the shelves of a cooking oven outwardly upon opening of the oven door.

An object of the present invention is to provide a mechanism for automatically extending the shelves of a cooking oven, which will be at a location removed from the oven compartment proper.

Another object of the invention is to provide a cam operated linkage actuated by the opening of the oven door, to extend the oven shelves outwardly of the oven compartment.

A further object of the invention is to provide a cam operated linkage actuated by the opening movement of the oven door to extend the oven shelves outwardly of the oven compartment in step formation.

Another object of the invention is to provide a shelf operating mechanism which will allow an over-ride of a shelf beyond the normal travel of the shelf by the said mechanism.

With these and other objects in view, the invention consists of certain novel features of construction as will be more fully described and particularly pointed out in the appended claims.

In the accompanying drawings:

FIGURE 9 is an elevational sectional view of the shelves support and track therefor;

FIGURE 10 is a similar view of another portion of the shelves supports;

FIGURE 11 is a sectional view of one of the bearings for the shelf support and the track along which said bearing is adapted to travel;

FIGURE 12 is a schematic cross-sectional view of the carriage with the rollers held therein;

FIGURE 13 is an elevation view of a further modified shelf operating mechanism;

FIGURE 14 is a similar view and showing the shelf operating mechanism in different relation;

FIGURE 15 is a plan view of a portion of the shelves operating mechanism of FIGURE 13 looking thereat in the direction of the arrows on line 15—15 of FIGURE 13;

FIGURE 16 is a plan view of a fragmentary portion of an oven shelf and modified support therefor;

FIGURE 17 is an edge view thereof;

FIGURE 18 is a sectional view taken along lines 18—18 of FIGURE 16;

FIGURE 19 is a section view taken substantially along line 19—19 of FIGURE 17; and FIGURE 20 is a view of a modified counter balance adapted for use with the shelf operating mechanism shown in the drawings.

Figure 1:
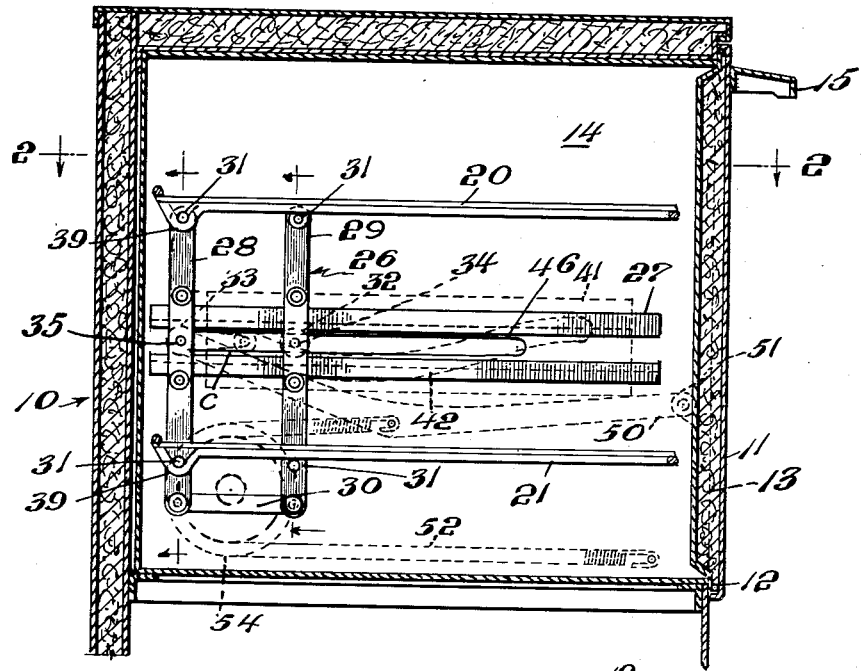
FIGURE 1 is a generally central sectional elevation view of a cooking oven embodying the invention.
Figure 2:
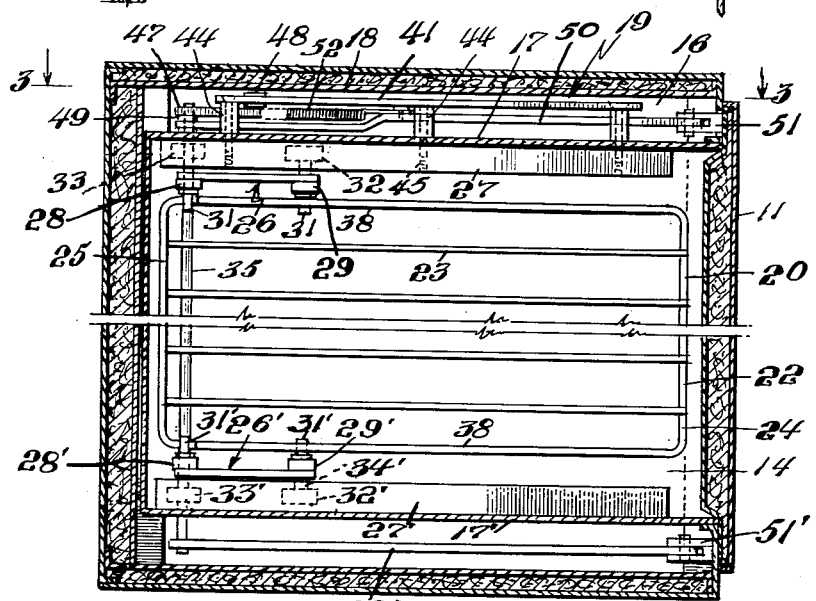
FIGURE 2 is a sectional view taken substantially along line 2—2 of FIGURE 1.
Figure 3:
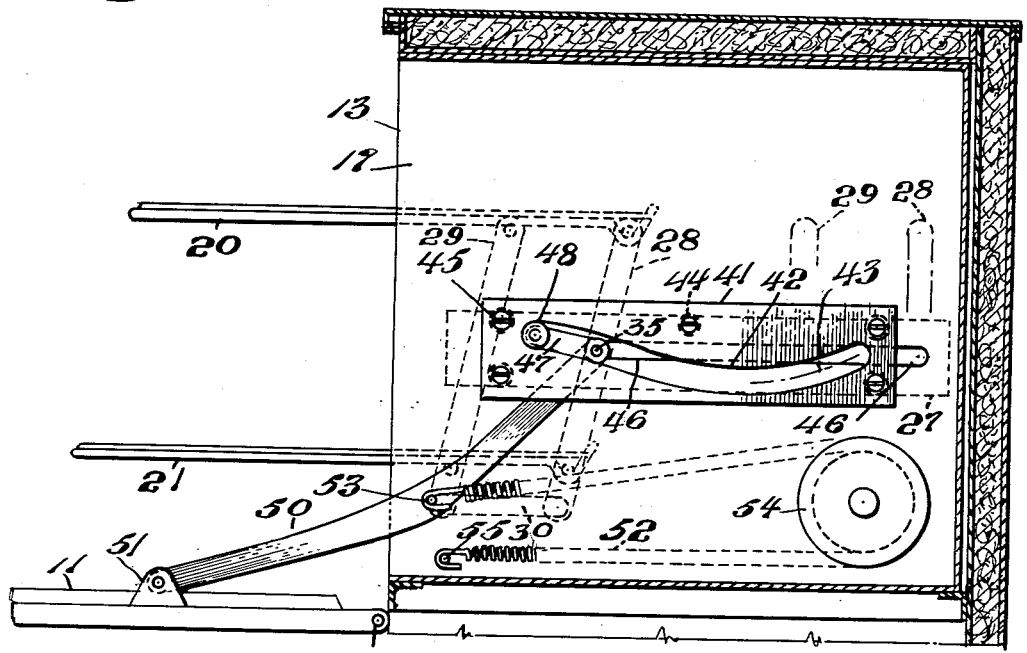
FIGURE 3 is a sectional view taken subtantially along line 3—3 of FIGURE 2 and showing the oven door in open position and the oven shelves in the extended relation.

Referring to the drawings in more detail, I have shown in FIGURES 1, 2, and 3 a cooking oven designated generally 10. The oven shown is intended to be representative of any conventional construction which has a closure or door 11 hingedly secured at its lower horizontal edge as at 12 to the lower marginal edge about the opening 13 of an oven compartment 14. A handle 15 is provided at the upper portion of the door 11 for swinging the door to open or closed relation. The oven compartment 14 may be made as a separate removable unit so as to provide a space 16 (see FIG. 2) at least on the outer side of the oven compartment between wall 17 thereof and the outer casing wall 18 to receive the shelf operating mechanism, generally indicated 19, carried by the wall 17. In an oven structure in which the oven compartment is not made a separate removable unit, a removable partition wall (not shown) substituted for the wall 17 may be provided and on which the shelf operating mechanism may be conveniently mounted.

In the present instance two shelves are shown, an upper shelf 20 and a lower shelf 21. These are of usual construction (see FIGURE 2) comprising a generally rectangular wire frame 22 provided with spaced cross wire bars 23 extending from the opposite sides 24, 25 of the frame and secured thereto as by means of a welding operation. The shelves are supported in a horizontal position on parallelogram linkages 26, 26' located on opposite side of the oven compartment. The linkages in turn are each mounted on carriages which are adapted to be moved along horizontal trackways 27, 27' secured to the walls 17, 17' respectively of the oven compartment.

The linkages 26 and 26' are similar to each other and are secured to a similar carriage for travel therewith and for movement relative thereto. Only the linkage 26 and associated elements will be described, similar parts of linkage 26' and associated elements will be designated by similar but prime numerals. The linkages 26 comprises a pair of links 28, 29 which are similar to each other and connected at their lower end by a link 30, the ends of which are pivotally secured thereto. Each link has a plurality of spaced shelf supporting pins 31 on which the shelves rest and are detachably secured thereto in a manner which will be hereinafter further described. The carriage comprises a bar C bifurcated at both ends to receive spaced rollers 32, 33 (see FIGS. 1, 9 and 10) which engage the trackway 27 for reciprocal travel therealong. The rollers 32 are in the form of a ball bearing (see FIG. 11), having an inner raceway in which is received and secured shaft 34 for rotation therewith. The rollers 33 are similarly formed by a similar ball bearing, the inner raceway of which receives a shaft 35 secured for rotation therewith, shafts 34 and 35 passing thru the bifurcated end of carriage C. The links 28, 29 are mounted approximately at their mid point on said shafts 34, 35 respectively and secured for movement therewith by means of pin fastenings 36 and 37 respectively. The shaft 35 is extended across the oven compartment to pass through link 28' at the approximate mid point thereof and continues therefrom to be received and secured to the inner raceway of roller 33', the link 28' being secured to shaft 35 so as to move therewith. Thus it will be apparent that through the connection of shaft 35, both linkage 26 and 26' will move angularly about the axes of shafts 34, 34' and 35 and for reciprocal travel along trackways 27, 27'.

Figure 7:
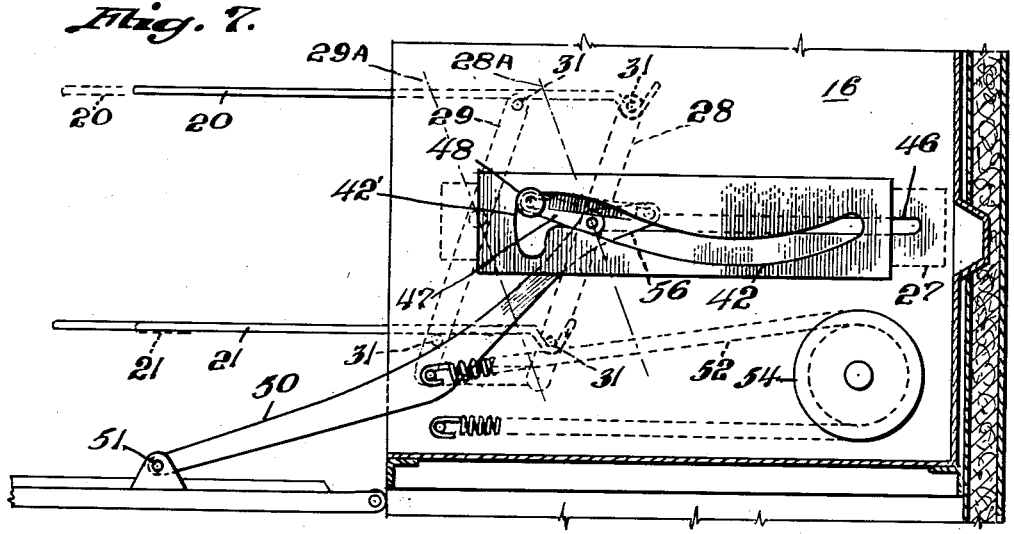
FIGURE 7 is a view similar to FIGURE 4 showing the oven door in open position and the oven shelves in the extended relation.
Figure 8:
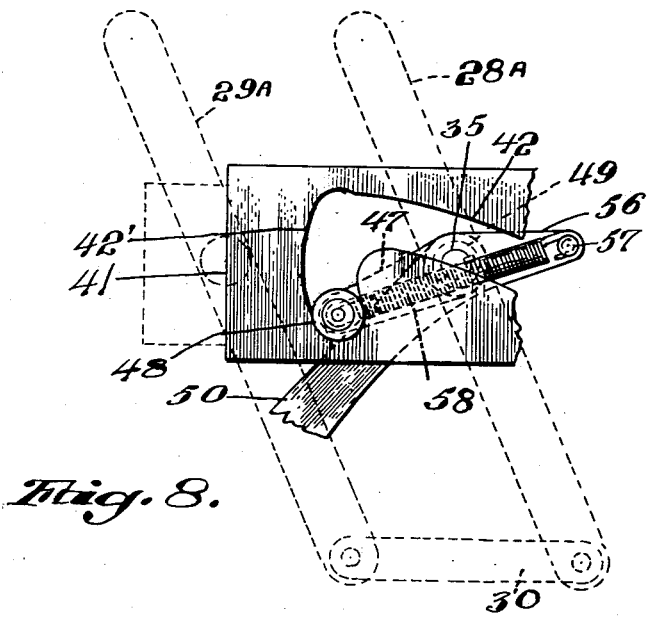
FIGURE 8 is an elevation view of a fragmentary portion of the shelf operating means shown in FIGURE 7 with the manual override operated.

Referring particularly to FIGURES 1 and 2, it will be seen that the sides 38 of the shelf frame 22 rest on the pins 31 of the forward links 29, 29' and that the rear portion of said sides 38 are bent into hook formation 39 so as to engage pins 31 on the rear links 28, 28'. Thus the shelves become detachably secured to the parallelogram linkage to travel therewith from the rear of the oven compartment towards the front and out thereof as best seen in FIGURE 7.

The shelf-operating mechanism 19 comprises a plate 41 which has horizontal extending cam slot 42 therethrough. The plate 41 is spaced from the outer side of wall 17 by spacer tubes 44 (see FIGURES 2, 9), and secured in position on said wall by screws 45 which also function to secure the trackway 27 to the wall 17. A straight longitudinal slot 46 extends through the wall 17 and is in line centrally with the trackway 27. The shaft 35 extends through said slot 46 (see FIG. 2), and has a crank lever 47 secured to the end of shaft 35 by a key for rocking movement therewith. A roller 48 is rotatably attached to the free end of crank 47 and extends into engagement in the cam slot 42. A sleeve 49 is positioned on shaft 35 in the space between crank 47 and wall 17 so as to provide a bearing on which is mounted one end portion of an arm 50, the other end of the arm being pivotedly secured to a bracket 51 secured to door 11. To provide a balanced structure, a similar arm 50' embraces shaft 35 at the opposite end thereof from arm 50, and extends to a bracket 51' on door 11.

Referring to FIGURE 3 it will be seen that each end of the cam slot 42 is on a semi-circle which is a radius equal to the radius of the roller 48 and that the inner semi-circular end of cam slot 42 is at the same height in the oven compartment as slot 46, the outer or other end of the cam slot being inclined and positioned above the slot 46. Thus it will be seen that in the closed relation of the door 11 as seen in FIGURE 1 the links 28, 29 will extend in a generally vertical position, because the roller 48 is in direct line with said slot 46. Upon initially swinging the door toward open position, the roller 48 will ride along cam slot 42 and through crank 47, rock shaft 35 counterclockwise as viewed in the direction of the arrows on line 3—3 of FIGURE 2 to swing the upper end portions of links 28, 29 forwardly to favor the top shelf 20, that is, the top shelf during the opening movements of the door will be advancing ahead of the bottom shelf 21. Thus food being cooked on the top shelf may be viewed by only a partial opening of door 11. This is advantageous, as in many instances, the top shelf 20 is employed more often than the bottom shelf 21. As the door moves to further open relation (see FIG. 3), the roller or cam follower 48 will be riding the incline of cam slot 42 which through crank 47 will swing the parallelogram linkage in the opposite or clockwise direction to favor or advance the bottom shelf 21 ahead of the top shelf 20 whereby food on either shelves may be removed without interference of the top shelf 20. A counter-balance device for the door 11 is provided, which may take the form of a pull spring 52 having one end anchored to arm 50 as at 53 and extending therefrom to pass around a free rotating drum 54, and fastened to pin 55.

From the above and with reference to the FIGURES 1 and 3, it will be apparent that I have disclosed a simple arrangement for sliding the shelves in and out of the oven compartment and yet maintain the oven compartment fairly free of operating structure. It will be further apparent that the parallelogram linkage advances the shelves out of the oven compartment to provide for easy access to the bottom shelf without interferences from the top shelf when the door is in full open position.

Figure 4:
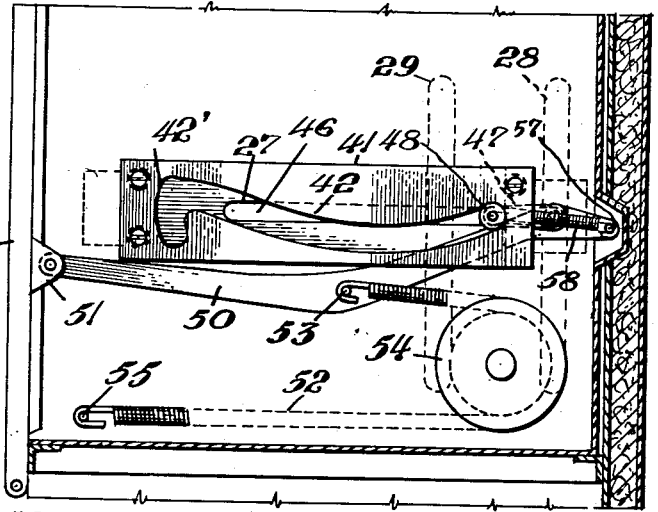
FIGURE 4 is an elevational view of a modified shelf operating mechanism.
Figure 5:
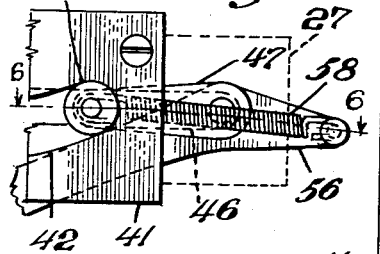
FIGURE 5 is an elevational view of a fragmentary portion of the shelf operating mechanism shown in FIGURE 4 on an enlarged scale.
Figure 6:
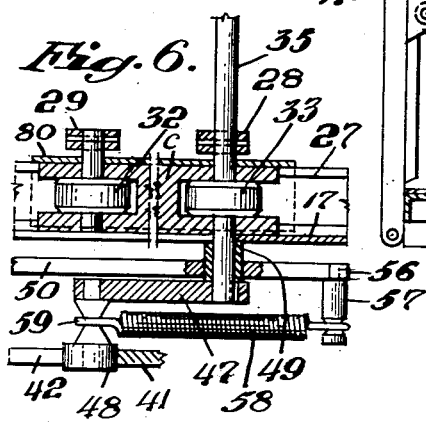
FIGURE 6 is a sectional view taken substantially along line 6—6 of FIGURE 5.

The cam design lends itself to several adaptations whereby the extension of one shelf may be favored over that of the other. A simple form is shown in FIGURES 4 to 8 wherein the outer end of cam slot 42 is modified as shown so as to provide a generally right angular cam slot 42' extending in continuation of slot 42. The arm 50 is extended rearwardly at 56 (see FIGURES 6 and 8), from which projects a pin 57. A pull spring 58 is arranged to have one end thereof secured to the pin 57, and the other end thereof secured at the roller end of crank 47 as at 59. With the oven door 11 in the closed position as seen in FIGURE 4, the roller 48 is confined within the slot 42, and no spring action is possible. This relation will be maintained until the door is virtually wide open and the roller 48 has approached the outer end of the cam 42 as shown in FIGURE 7. At this point, the action of spring 58 is such that it tends to rotate shaft 35 in a clockwise direction. At this position, the cam follower 48 will engage the upper edge of cam slot portion 42' as seen in FIGURE 7, and the lower shelf 21 will have been advanced further outward of the oven compartment 14 by reasons of the rocking of links 28, 29. The upper shelf 20 may now be manually pulled forward which will rock the links 28, 29 about their centers which in turn through shaft 35 and crank 47 will swing cam follower 48 along slot 42' to the lower end thereof and the rest position shown in broken lines 28A, 29A in FIGURES 7 and 8. The pull of the spring 58 will now apply a force to the cam follower 48 just below the center of shaft 35 thereby locking the shelves in the broken line position shown in FIGURE 7. In order to close the door 11 the top shelf 20 is manually pushed inwardly so as to return the parallelogram linkage to the relation shown in FIGURE 7, whereupon the door 11 may be moved to closed position.

In FIGURES 13, 14 and 15 there is shown a construction which allows a choice of shelf to be favored, that is, selectively either shelf can be advanced the furthest when the door is fully open. The cam 41 in this instance is modified to provide cam surfaces 60, 61 which extend from the upper and lower parts of the right angular cam slot portion 42'. A link 62 is mounted for free rocking movement about the axis of shaft 35 and extends from either side of the pivotal axis thereof and provides arms 63 and 64. A pin 65 projects from arm 63 and the arm 64 extends between limit stops 66, 67 which travels with the parallelogram linkage along trackway 27, being fastened to carriage C as at 68. A pull spring 69 is arranged to bias the arm 64 into engagement against one or the other of stops 66 and 67. One end of the spring is attached to pin 65 and the other end is attached to the crank 47 as at 70. It will be seen in FIGURE 13 that when the cam follower 48 is engaged against the upper end portion of cam slot 42', the pull of the spring 69 will act in a direction to yielding hold the cam follower 48 against cam surface 60. When the cam follower 48 is moved to engage the lower end of slot 42', the link 62 will be rocked about axis of shaft 35 to swing arm 64 against stop 67 and the arm 63 to move to the other side of said axis for the spring 69 to exert a force on crank 47 to yieldingly hold the cam follower to travel along the cam surface 61. The link 62 is in effect a toggle which functions to move the spring 69 to one side or the other of the axis of shaft 35.

From the above it will be apparent that if it is desired to favor the lower shelf, the cam follower 48 is moved to engage surface 60, the upper of slot 42', as seen in FIGURE 13, this being accomplished by manually pulling the lower shelf forward in the way previously described. The shelf operating mechanism will now be in condition to advance the lower shelf ahead of the top shelf. If it is desired that the top shelf be the one to extend the most forward, the cam follower 48 is moved to engage the lower surface 61 of cam slot 42', and the link 62 will move arm 64 against stop 67 to position the spring 69 to bias the follower to ride along cam surface 61.

In some instance it may be desirable to provide for greater extension of the lower shelf outwardly of the oven compartment than provided by the movement of the opening of the door 11. Accordingly I have shown in FIGURES 16 and 17 an adapter bar 71 having spaced lugs 72, 72' each of which is provided with a recess 73 (see FIG. 18) which slidably receives the side members 38 of the shelf frame. The bar is also provided at the inner end portion thereof with recesses 74, 75 which extend inwardly from opposite edges of the bar. The recess 74 (see FIG. 17), is adapted to be inserted over a pin 81 on the link 29' and the recess 75 is adapted to be inserted on the pin 81' of link 28' to bear thereon from the underside thereof. It will, of course, be understood that the opposite side of the oven compartment will be also provided with a similar bar 71 and that the shelf frame is supported at opposite sides in the said bars as above described. Each side member 38 of the shelf frame is provided with spaced abutments 76, 76' (see FIG. 17) which form limit stops to engage against lugs 72 so as to limit the distance of sliding of the shelf both inwardly and outwardly. It will be seen in FIGURE 19, that the stops 76 are notched at the upper end portion thereof as at 78. In these notches, the side members 38 of the upper shelf may be received to rest therein in a condition where use of the oven compartment dictates maximum vertical space above the bottom shelf.

Let it be assumed the door of the oven is in closed relation in which position the abutment 76 will be adjacent the abutment 72. Upon opening of the oven door, the lower shelf 21' will be advanced as a unit, as previously described, by the bar 71 and the stop 76 engaged with lug 72. When the door is fully open, the shelf 21' may be manually slid outwardly to a distance allowed by the stop 76' engaging against the lug 72'.

In cooking food in an open vessel such as roast and the like, grease will splatter and in order to avoid splattering of such grease on the rollers of the parallelogram carriage, a grease guard is provided. This may take the form shown in FIGURES 9 to 11 which comprises a plate 80 generally U-shaped in cross section providing arms 82 which straddle the track 27 and a connecting bridge plate 83 extending along the inner side surface of the trackway. The bridge 83 is provided with openings 84 through which shafts 34 and 35 pass and which connects the grease guard to said shafts to travel therewith. For clarity of illustration, the grease guard is not shown in all figures in the drawing.

I have shown a counter balance for the door 11 in the form of a pull spring. It may, however, be preferable in some installations to provide a weighted counter balance as shown in FIGURE 20. This comprises a bell crank-like lever 88 pivoted as at 89 and provided with a weighted arm 90. The other arm 91 is connected to the operating arm 50 through a link 92 which is pivoted at one end thereof to the arm 50 as at 93 and to the arm 91 as at 94. In the fully open relation of door 11, the counter balance 90 and associated elements will be in the position shown in full lines, wherein a force is applied on a line bracket 51 and arm 50, thus balancing the weight of the door. As the door is closed, the counter balance applies a diminishing force which tends to balance the door in all positions. The fully closed position is shown in broken lines.

I claim:

1. In an oven having an opening and a door for said opening, two trackways one each mounted on opposite side walls in said oven, a carriage mounted on each of said trackways for reciprocating travel therealong, a parallelogram shelf support pivotally connected to each carriage for movement therewith and for rocking movement relative thereto, a pair of arms pivotally connecting said door to said carriages for moving the same along the trackways during the closing and opening movement of said door, a cam track adjacent one of said trackways and cam follower means operating in said cam track fixedly connected to said support and pivotally connected to one of said carriages for movement therewith, said cam follower means being operable during the closing and opening movement of said door to rock its respective support about the pivoted connection thereof relative to said carriage.

2. In an oven having an opening and a door for said opening, two trackways one each mounted on opposite side walls in said oven, a carriage mounted on each of said trackways for reciprocating travel therealong, a parallelogram shelf support pivotally connected to each carriage for movement therealong and for rocking movement relative thereto, means connecting said door to said carriages for moving said carriages along said trackways during the closing and opening movements of said door, a cam track adjacent one of said trackways a crank including a cam follower connected to said support and pivotally connected to one of said carriages for movement therewith, and a cam attached to said oven to actuate said cam follower to rock said support relative to its respective carriage.

3. In an oven, the combination with a pivoted parallelogram linkage and a door, means carried by said linkage for supporting shelves in generally horizontal planes, said linkage being pivotally mounted for horizontal movement between the rear of the oven and the front thereof, arm means pivotally connecting said door to said linkage at the said pivotal mounting for moving the same between the rear of the oven and the front thereof during the opening movement of said door, and cam follower means fixedly connected to said linkage for movement therewith and a cam attached to said oven to actuate said cam follower means for rocking said parallelogram linkage throughout the movement thereof from the rear of said oven to the front thereof and to extend said shelves in step formation outwardly of said oven.

4. In an oven having a cooking compartment provided with an opening thereto, a horizontally hinged door for said opening, a horizontal trackway mounted in said compartment, a generally vertically extending rockable parallelogram shelf support within said compartment pivotally mounted in said trackway for travel in a general horizontal direction, spaced means carried by said support for supporting shelves thereon in horizontal planes one above the other and on either side of said pivotal mounting, said support when said door is in the closed relation being positioned at the rear of said compartment and said shelves being aligned with each other, and cam follower means fixedly connected to said support and a cam attached to a side wall of said compartment to actuate said cam follower and operable to rock said support to extend said shelves outwardly of said compartment in step formation upon moving said door to open relation.

5. In an oven having a cooking compartment provided with an opening thereto, a horizontally hinged door for said opening, a trackway secured to each side wall of said compartment, a roller carriage mounted on said trackway for reciprocating travel therealong, a parallelogram shelf support pivotally secured to said carriage for movement therewith and rockable movement relative thereto, spaced means carried on said support for supporting shelves in a general horizontal plane one above the other, said support being positioned at the rear of said compartment when said door is in the closed relation with the rear edge of said shelves extending in line with each other, means connecting said door to said support for reciprocal movement along said trackway, and cam follower means fixedly connected to said support and a cam attached to a side wall of said compartment to actuate said cam follower for rocking said support during the travel thereof toward the front of the oven to advance said shelves in step formation.

6. In an oven having a cooking compartment, a trackway secured to each of the opposite side walls of said compartment, a parallelogram linkage shelf support mounted on each of said trackways for travelling therealong and for rocking movement relative thereto, each said parallelogram linkage support comprising a pair of similar links connected at their lower ends with a third link and having shelf supporting means at their upper ends, means connecting said parallelogram linkage supports for common rocking movement and for travelling in unison along the trackways, a cam track adjacent one of said trackways, and cam follower means connected to one of said parallelogram linkage supports and operable in said cam track for rocking said parallelogram linkage supports relative to said trackways during the travel of said parallelogram linkage supports along said trackways.

7. In an oven, the combination with parallelogram linkage supports and a door, a trackway extending horizontally along each side of said oven, means for rockably mounting one parallelogram linkage support in each of said trackways and permitting movement of said parallelogram linkage supports between the rear of said oven and the front thereof, means on said parallelogram linkage supports for horizontally supporting shelves thereon, means connecting said door to said parallelogram linkage supports for moving same along said trackways during opening and closing of said door, and cam follower means fixedly connected to one of said parallelogram linkage supports for movement therewith and a cam attached to the adjacent side of the oven to actuate said cam follower means to rock said parallelogram linkage supports throughout the travel thereof toward the front of the oven to extend the shelves out of said oven in step formation.

References Cited in the file of this patent

UNITED STATES PATENTS

| | | |
|---|---|---|
| 888,735 | Person | May 26, 1908 |
| 1,062,263 | Sundquist | May 20, 1913 |
| 1,409,203 | Schey | Mar. 14, 1922 |
| 1,487,950 | Kimmerle | Mar. 25, 1924 |
| 1,851,183 | Hill | Mar. 29, 1932 |
| 1,894,268 | Forsyth et al. | Jan. 17, 1933 |
| 2,070,049 | Hillman | Feb. 9, 1937 |
| 2,296,950 | Roedl | Sept. 29, 1942 |
| 2,297,969 | Matheson | Oct. 6, 1942 |

FOREIGN PATENTS

| | | |
|---|---|---|
| 495,995 | Great Britain | Nov. 23, 1938 |